No. 836,124. PATENTED NOV. 20, 1906.
H. R. MASON & C. C. FARMER.
LOAD BRAKE APPARATUS.
APPLICATION FILED FEB. 17, 1904.

Witnesses:

Inventors:
Clyde C. Farmer
Harry R. Mason
by Paul Synnestvedt
Attorney.

No. 836,124. PATENTED NOV. 20, 1906.
H. R. MASON & C. C. FARMER.
LOAD BRAKE APPARATUS.
APPLICATION FILED FEB. 17, 1904.
2 SHEETS—SHEET 2.
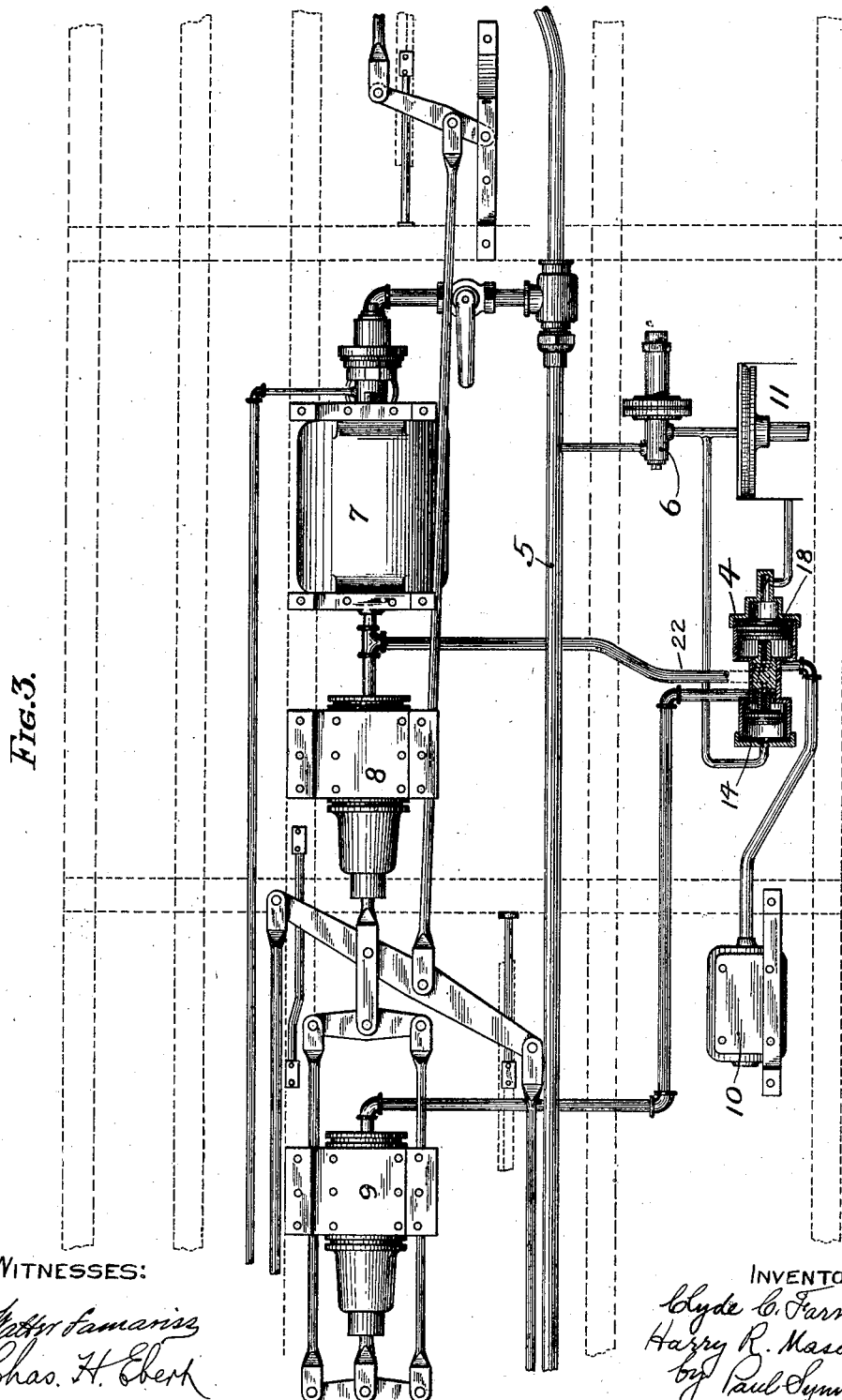

UNITED STATES PATENT OFFICE.

HARRY R. MASON AND CLYDE C. FARMER, OF CHICAGO, ILLINOIS, ASSIGNORS TO WESTINGHOUSE AIR BRAKE COMPANY, OF WILMERDING, PENNSYLVANIA, A CORPORATION OF PENNSYLVANIA.

LOAD-BRAKE APPARATUS.

No. 836,124.     Specification of Letters Patent.     Patented Nov. 20, 1906.

Application filed February 17, 1904. Serial No. 194,101.

*To all whom it may concern:*

Be it known that we, HARRY R. MASON and CLYDE C. FARMER, citizens of the United States, residing at Chicago, in the State of Illinois, have invented certain new and useful Improvements in Load-Brake Apparatus, of which the following is a specification.

This invention has reference to the provision of load brake mechanism in combination with the train pipe brake cylinder and reservoir of an automatic air brake, which load brake mechanism shall be controllable automatically by variations of the train pipe pressure and at the same time shall be automatically cut out when the train pipe pressure shall exceed a certain pre-determined limit, so that the normal action of the brake shall not in any wise be interfered with so long as the pressure in the train pipe continues above such limit.

A further object of this invention is the provision of mechanism of the character specified which will be automatically set as the pressure in the train pipe is being pumped up when the train is first connected, and which will be automatically cut out and left in the proper set position after the train pipe pressure has passed the said pre-determined limit.

A further object of this invention is the provision of an automatic cut out device controlling the communication between the train pipe and the load brake mechanism, such cut out device being constructed so as to operate at a certain pre-determined limit of pressure to close communication between the train pipe and the load brake mechanism, and to open an escape of pressure to permit the air to exhaust to the atmosphere from the load brake apparatus leaving the said apparatus in proper set position.

The above, as well as such other objects as may hereinafter appear, we attain by means of the construction which we have illustrated in preferred form in the accompanying drawings, wherein—

Figure 3 is a general inverted plan view of the air brake mechanism applied under a car showing a train pipe, a triple valve mechanism, a brake cylinder and a reservoir of an automatic air brake the same being designed to be used in conjunction with other devices which form the subject matter of application Serial No. 194,109 now pending in the Patent Office filed by one of the inventors of this improvement.

Referring now more particularly to Figure 3 it will be seen that in carrying out our invention we provide a change valve 4 which is designed to be actuated by fluid pressure from the train pipe 5 the communication wherefrom is controlled through a cut out device 6. The ordinary reservoir is indicated at 7, the ordinary cylinder is indicated at 8, and the load brake cylinder at 9, and at 10 is indicated a dummy cylinder or expansion chamber which is designed to take the surplus of pressure when the load brake cylinder 9 is cut out of action. At 11 is shown a lift cylinder which in this form of improvement is applied in conjunction with a change valve 4 and determines the action.

Figure 1:
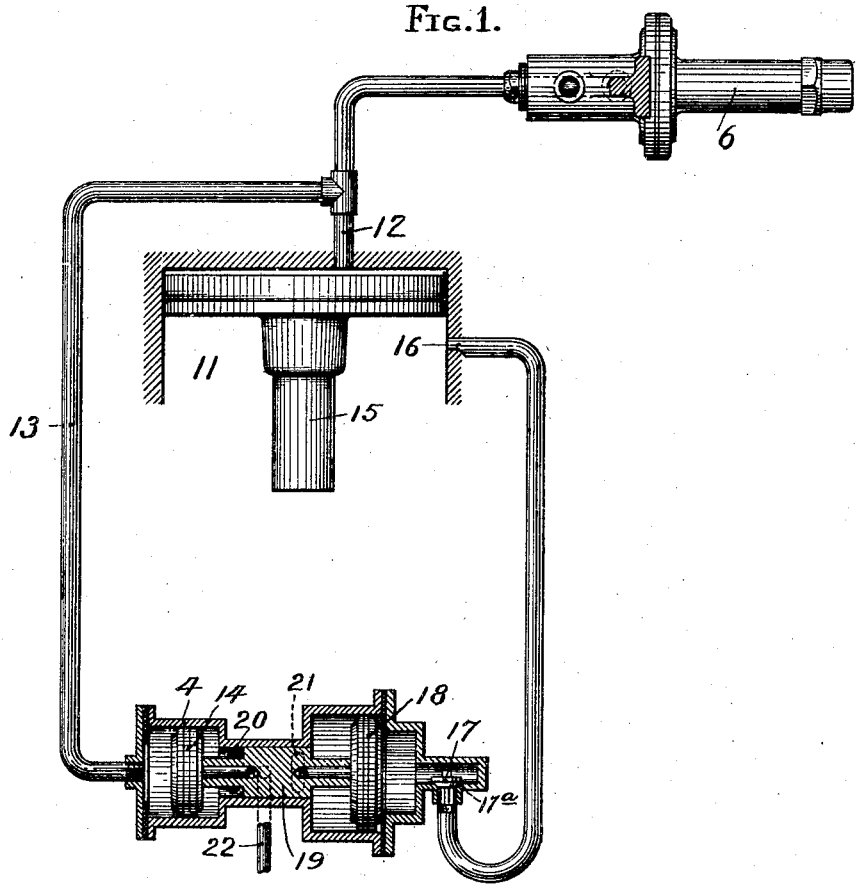
Figure 1 is a diagrammatic view showing the load brake mechanism proper with the cut out device connected therewith, the change valve being indicated in section.

Referring now more particularly to Figure 1 it will be seen that the air from the train pipe 1 after passing the cut out device 6 is led through the pipe 12 to the lift cylinder 11 and another pipe 13 to the left hand side of the change valve 4 exerting pressure against the smaller piston 14 thereof in a direction to push it to the right. The piston 15 of the lift cylinder is arranged at the upper end of the cylinder and when it moves down sufficiently far to uncover the opening 16 air from the pipe 12 will pass around and by the check valve 17 entering the right hand end of the change valve 4 and exerting force against the larger piston 18. Between the pistons 14 and 18 is a slide valve 19 which forms the change valve proper, and in the form of the invention shown this slide valve controls a port opening 20 which leads to a load cylinder, and also another port opening 21 which in this instance leads to a dummy-cylinder, the air in the slide valve chamber and also upon the inner face of each of the pistons being admitted through a pipe 22 that comes from the first or ordinary brake cylinder of the brake system.

Figure 2:
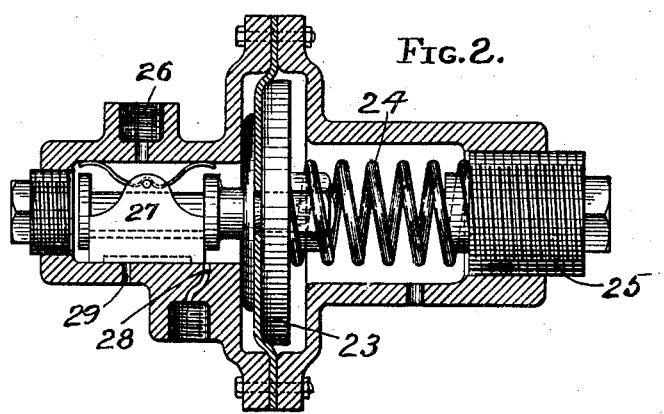
Figure 2 is a sectional view of the cut out device which we prefer to use.

Referring now to Figure 2, which shows the sectional view of the cut out device, it will be seen that the same comprises essentially a piston 23 held to the left by a spring 24 adjusted by means of a nut 25 against pressure admitted from the train pipe through the opening 26. Connected with the piston 23 is a slide valve 27 the connection being such that in the position shown the slide valve 27 uncovers the port opening 28 leading to the pipe that communicates with the load brake mechanism. At 29 is provided an exhaust passage to the atmosphere which when the piston and slide valve move to the right opens communication with the port 28 and exhausts the pressures from the pipe of the load brake mechanism in a manner which will be clear when further description of the operation of the load brake mechanism is reached. The spring 24 is preferably set at a low pressure, say about 30 pounds, then when the train pipe pressure is 30 pounds the piston will be moved to the right and cut off the port opening 28 completely closing communication between the load brake mechanism and the train pipe, such closed communication being maintained closed so long as the train pipe pressure continues above 30 pounds. By this means all interference with the normal action of the brake at any point above 30 pounds due to any possible effect of this load brake mechanism is obviated, and all of the brakes in the train are immediately set in proper position that is either for loaded or light application as soon as train pipe pressure in being pumped up has accumulated to 30 pounds.

The operation of our invention is as follows: The train being coupled up and air being admitted to the train pipe passes through the cut out device and the port 28 in to the load brake mechanism, and enters the lift-cylinder 11 and also passes through the pipe 13 around to the left side of the piston 14, moving it to the extreme right hand position leaving the piston 18 against the chamber on its right side. No pressure will flow past the lift cylinder through the opening 16 if the car is loaded for the lift cylinder will not operate when the car is loaded on account of the heavy pressure which opposes its movement. Therefore when the car is loaded the parts of the change valve will be in the position shown in Figure 1 in which the port opening 20 will be uncovered by the slide valve 19 and permit the air from the first or ordinary cylinder coming through the pipe 22 to pass to the load cylinder 9 giving the augmented pressure required for braking the extra weight. If the car is not loaded the piston in the lift cylinder will move downward and uncover the opening 16 when air will pass around and going by the check valve 17 will act upon the larger piston 18 in opposition to the piston 14 and move the entire change valve mechanism to the left, covering the port 20 and uncovering the port 21 which leads to the dummy cylinder 10, thus cutting out the load cylinder and opening up the dummy cylinder and throwing the brake into operation for light power. When the pressure in the train pipe reaches 30 pounds the movable abutment or piston 23 will pull the slide valve 27 over so as to cover the port 28 cutting off communication between the train pipe and the load brake mechanism and at the same time opening the exhaust port 29 and allowing the air from the lift cylinder and the connected pipes of the load brake mechanism to escape. In order that this escape of pressure from the load brake apparatus shall not disarrange any of the mechanism but shall leave the brakes set as required, that is, either in loaded or light position, the slide valve 19 is made without fixed or definite connection between the pistons 14 and 18 so they can both push upon the slide valve but cannot pull it, and when the pressure from the pipes 13 and the pipe into which the opening 16 leads, escapes the cylinder pressure from the first cylinder which is within the change valve casing and operating on the inner faces of the two pistons, will act to spread the pistons apart but will not move the slide valve. Thus if the apparatus be as shown in Figure 1 with the load brake in action the piston 14 will move to the left when the air escapes from the pipe 13 but will not pull the slide valve 19 along with it, thus leaving the brakes set for load brake position. The pressure from the ordinary or first cylinder through the pipe 22 will of course still hold the piston 18 in the position shown.

If the change valve device be in position for light car, then of course the slide valve is on the left hand position and the escape of pressure from the pipe 13 and the pipe leading to the right side of the change valve, will not shift the slide valve because the pressure escapes faster from the pipe 13 than from the chamber on the opposite side of the change valve, due to the presence of the check valve 17 which causes a slow escape of the air from the right hand chamber of the change valve, the check valve 17 having therein a restricted opening 17$^a$ for this purpose. It will be evident, that if the check valve 17 with its restricted passage were not present the pipe which leads to said check valve would be rapidly vented as soon as the lift cylinder piston moved up past the opening 16, and this would before the air had chance to escape from the left side of the piston 14 cause the parts to reverse and take the position shown in the drawing, but the presence of the restricted passage 17$^a$ and the check valve 17 prevents this and allows the air all to escape from the pipe 13 before all the pressure has escaped from the right side of the piston 18, after which the piston 18 is moved to the right when the parts are in light car position by the pressure in the cylinder acting upon the inner face of the said piston.

In order to get the required operation of the lift cylinder and the change valve it is of course necessary that they should be arranged to operate at a pressure less than 30 pounds or whatever the cut out valve may be set at, otherwise the cut out valve would tend to cut out the mechanism before the change valve could come into play. In our preferred arrangement we design these parts to act on a pressure of about 20 pounds.

Upon an examination of the operation just described it is evident that our mechanism not only cuts out automatically when the pre-determined pressure is reached but also when the air is exhausted from the train pipe and the train is broken up, will cut into operative position again so as to be ready to set the brake either for a loaded or light car as the case may require, whenever the car is again coupled into service. It is also evident that, in the arrangement shown and described, the brake cylinder pressure acts as a seal to lock the reversing mechanism in the position in which it is set, so that in case the train pipe pressure is reduced below the operating pressure of the intercepting valve no interference with the set position of the parts will be possible, the same returning to normal state only after the train pipe shall have been vented.

Having thus described our invention and illustrated its use, what we claim as new, and desire to secure by Letters Patent, is the following:

1. An air brake apparatus comprising the combination with a train pipe, a brake cylinder and a reservoir of a load brake mechanism having a change valve and a cut out device controlling communication between the train pipe and the load brake mechanism, substantially as described.

2. An air brake apparatus comprising the combination with a train pipe, a brake cylinder, and a reservoir of a load brake mechanism having a change valve and an automatic cut out device controlling communication between the train pipe and the load brake mechanism, said cut out device being constructed to act to cut off communication between the train pipe and the load brake mechanism at a predetermined train pipe pressure.

3. An air brake apparatus comprising the combination with a train pipe, a brake cylinder, and a reservoir of a load brake mechanism having a change valve and an automatic cut out device controlling communication between the train pipe and the load brake mechanism, said cut out device being constructed to act to cut off communication between the train pipe and the load brake mechanism at a predetermined train pipe pressure, and to vent the load brake mechanism to the atmosphere when the train pipe is cut out, substantially as described.

4. An air brake apparatus comprising the combination with a train pipe, a brake cylinder, and a reservoir of a load brake mechanism having a change valve, a lift cylinder, means by which the operation of said change valve is determined by said lift cylinder, and a cut out device controlling communication between the train pipe and the load brake mechanism.

5. An air brake apparatus comprising the combination with a train pipe, a brake cylinder and a reservoir of a load brake mechanism comprising in combination a change valve, an automatic cut out device interposed between the train pipe and the load brake mechanism and provided with means for venting the load brake mechanism to the atmosphere when the train pipe is cut out, substantially as described.

In testimony whereof we have hereunder signed our names in the presence of the two subscribed witnesses.

HARRY R. MASON.
CLYDE C. FARMER.

Witnesses:
   PAUL SYNNESTVEDT,
   PAUL CARPENTER.